US009064532B2

(12) United States Patent
Hancock et al.

(10) Patent No.: US 9,064,532 B2
(45) Date of Patent: *Jun. 23, 2015

(54) ACCURATE RADIUS AND VELOCITY MEASUREMENT OF TAPE TRANSPORTS

(71) Applicant: International Business Machines Corporation, Armonk, NY (US)

(72) Inventors: Reed A. Hancock, Tucson, AZ (US); Randy C. Inch, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/284,242

(22) Filed: May 21, 2014

(65) Prior Publication Data

US 2014/0254045 A1 Sep. 11, 2014

Related U.S. Application Data

(63) Continuation of application No. 13/600,069, filed on Aug. 30, 2012, now Pat. No. 8,767,335.

(51) Int. Cl.
| | |
|---|---|
| *G11B 15/48* | (2006.01) |
| *G11B 15/46* | (2006.01) |
| *B65H 59/38* | (2006.01) |
| *G11B 15/32* | (2006.01) |
| *G11B 5/584* | (2006.01) |

(52) U.S. Cl.
CPC ............. *G11B 15/32* (2013.01); *G11B 5/584* (2013.01); *G11B 15/46* (2013.01)

(58) Field of Classification Search
None
See application file for complete search history.

(56) References Cited

U.S. PATENT DOCUMENTS

| | | | |
|---|---|---|---|
| 6,622,113 B2 | 9/2003 | Koski et al. | |
| 6,754,026 B1 | 6/2004 | Koski | |
| 8,767,335 B2 * | 7/2014 | Hancock et al. | ................ 360/71 |
| 2003/0127551 A1 | 7/2003 | Abedor et al. | |
| 2009/0206190 A1 | 8/2009 | Bui et al. | |
| 2009/0222232 A1 | 9/2009 | Redhead et al. | |
| 2012/0019953 A1 | 1/2012 | Bui et al. | |
| 2014/0063650 A1 | 3/2014 | Hancock et al. | |

FOREIGN PATENT DOCUMENTS

| | | |
|---|---|---|
| EP | 0 810 595 A2 | 3/1997 |
| WO | 96/10252 A1 | 4/1996 |

OTHER PUBLICATIONS

Gentilini et al., "Lateral Tape Motion Control with Robust Performance Evaluation Based on RBode Plot," 2011.

* cited by examiner

*Primary Examiner* — Andrew L Sniezek
(74) *Attorney, Agent, or Firm* — Zilka-Kotab, PC

(57) ABSTRACT

A method according to one embodiment includes computing a radius value of a tape on an outgoing reel during unwinding of the tape from the outgoing reel, adjusting the computed radius with an offset calculated from a direct measurement of velocity from the tape position, and outputting the adjusted computed radius. A method according to another embodiment includes computing a radius value of a tape on an incoming reel during winding while the tape is being wound onto the incoming reel, adjusting the computed radius with an offset calculated from a direct measurement of velocity from the tape position, and outputting the adjusted computed radius.

20 Claims, 9 Drawing Sheets

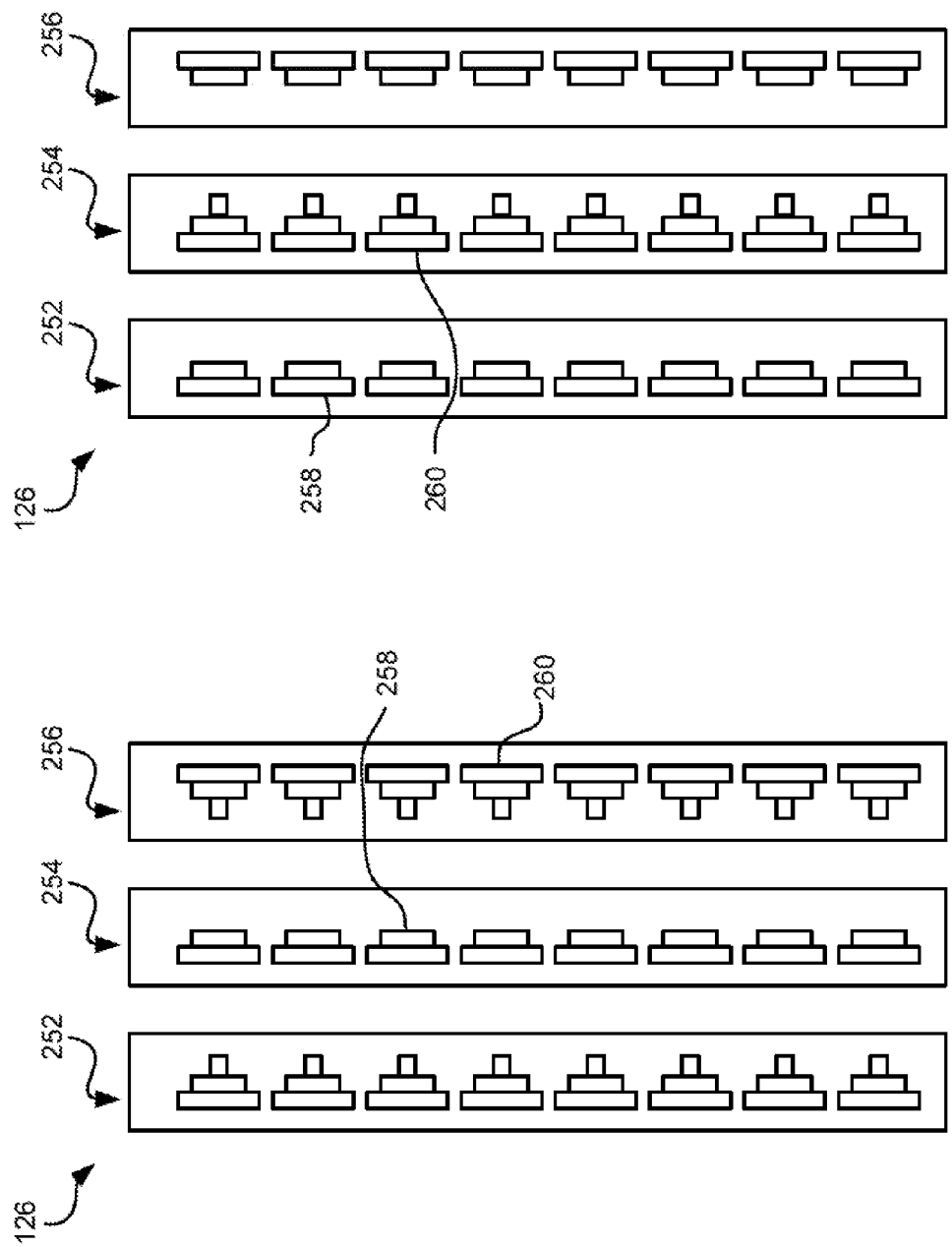

US 9,064,532 B2

ACCURATE RADIUS AND VELOCITY MEASUREMENT OF TAPE TRANSPORTS

RELATED APPLICATIONS

This application is a continuation of U.S. patent application Ser. No. 13/600,069, filed Aug. 30, 2012, now U.S. Pat. No. 8,767,335, which is herein incorporated by reference.

BACKGROUND

The present invention relates to data storage systems, and more particularly, this invention relates to providing a system, method and computer program product for accurately measuring a radius and velocity of tape transports.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head and tape surface roughness are designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

A method according to one embodiment includes computing a radius value of a tape on an outgoing reel during unwinding of the tape from the outgoing reel, adjusting the computed radius with an offset calculated from a direct measurement of velocity from the tape position, and outputting the adjusted computed radius.

A method according to another embodiment includes computing a radius value of a tape on an incoming reel during winding while the tape is being wound onto the incoming reel, adjusting the computed radius with an offset calculated from a direct measurement of velocity from the tape position, and outputting the adjusted computed radius.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Moreover, program instructions for performing the methods may be embodied on a computer program product.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
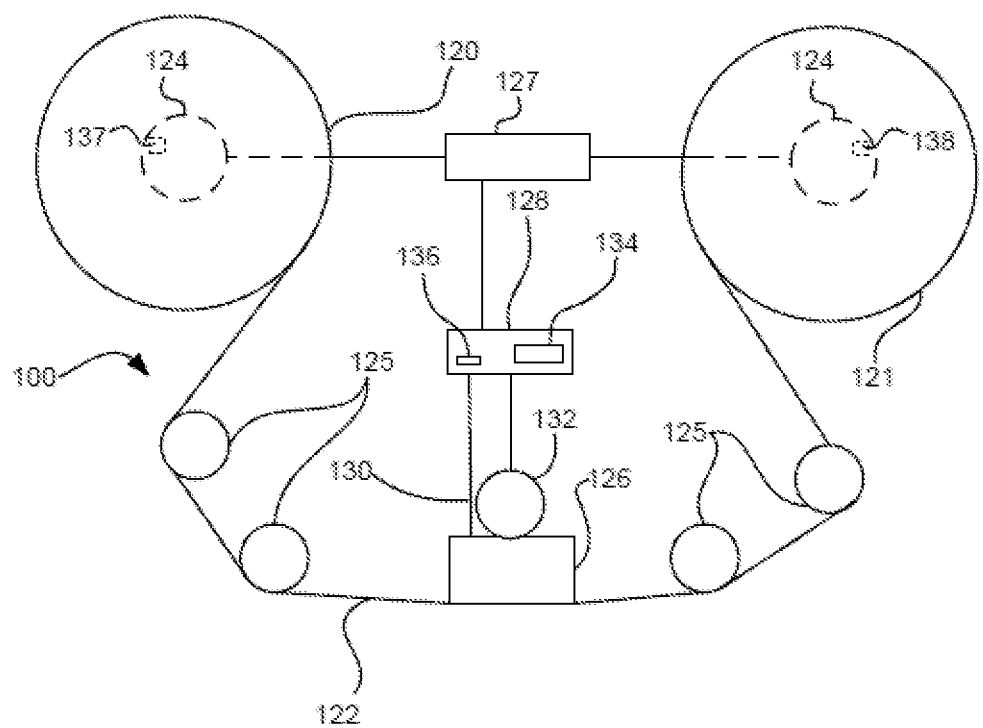
FIG. 1A is a schematic diagram of a simplified tape drive system according to one embodiment.

The following description made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a method includes selecting an initial radius value (Rfull) for an outgoing reel, where Rfull is the initial radius of a tape on the outgoing reel; unwinding the tape from the outgoing reel; computing a radius value of the tape on the outgoing reel during the unwinding; adjusting the computed radius with an offset calculated from a direct measurement of velocity from the tape position; and outputting the adjusted computed radius.

In another general embodiment, a method includes selecting an initial radius value (R0) for an incoming reel, where R0 is the initial radius of the incoming reel; winding the tape onto the incoming reel; computing a radius value of the tape on the incoming reel during the winding; adjusting the computed radius with an offset calculated from a direct measurement of velocity from the tape position; and outputting the adjusted computed radius.

In one general embodiment, a system includes a magnetic head; a drive mechanism for passing a magnetic medium over the magnetic head; and a controller electrically coupled to the magnetic head. The controller is configured and/or programmable to: select an initial radius value (R0) for an incoming reel, where R0 is the initial radius of the incoming reel; cause winding of the tape onto the incoming reel; compute a radius value of the tape on the incoming reel during the winding; adjust the computed radius with an offset calculated from a direct measurement of velocity from the tape position; and output the adjusted computed radius.

In another general embodiment, a system includes a magnetic head; a drive mechanism for passing a magnetic medium over the magnetic head; and a controller electrically coupled to the magnetic head. The controller is configured and/or programmable to: select an initial radius value (R0) for an incoming reel, where R0 is the initial radius of the incoming reel; cause winding of the tape onto the incoming reel; compute a radius value of the tape on the incoming reel during the winding; adjust the computed radius with an offset calculated from a direct measurement of velocity from the tape position; and output the adjusted computed radius.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both. The tape drive may also include a driver mechanism 127 to supply current to the drive motor(s) 124. The driver mechanism 127 may be coupled to a controller 128 and the drive the drive motor(s) 124 via a cable. The tae drive additional include hall count sensors 137 and 138 to provide data (e.g. hall counts) associated with the position of drive motor(s) 124.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
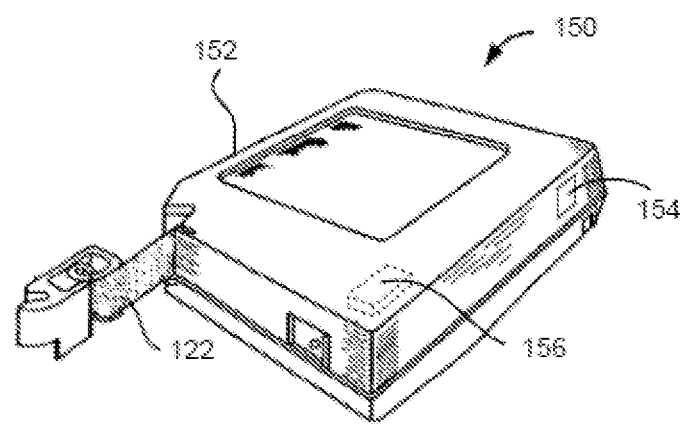
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
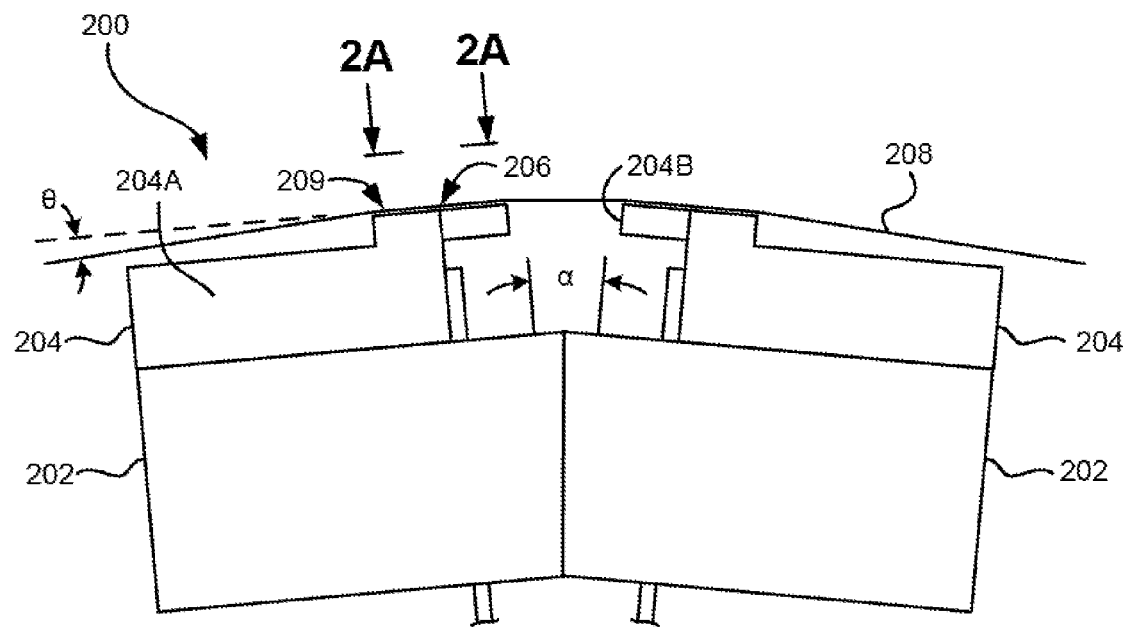
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
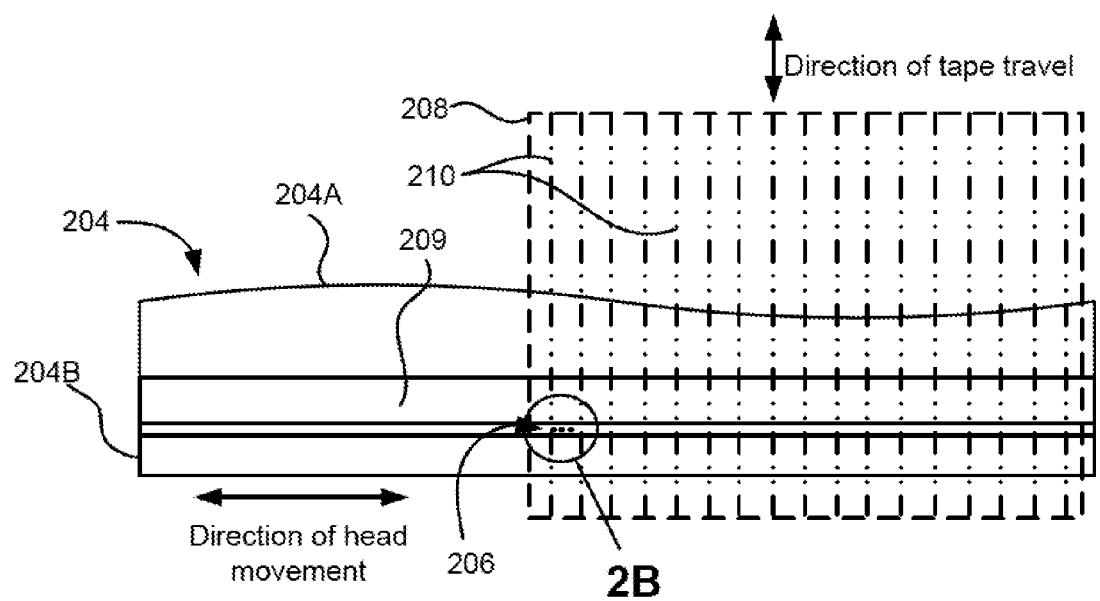
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
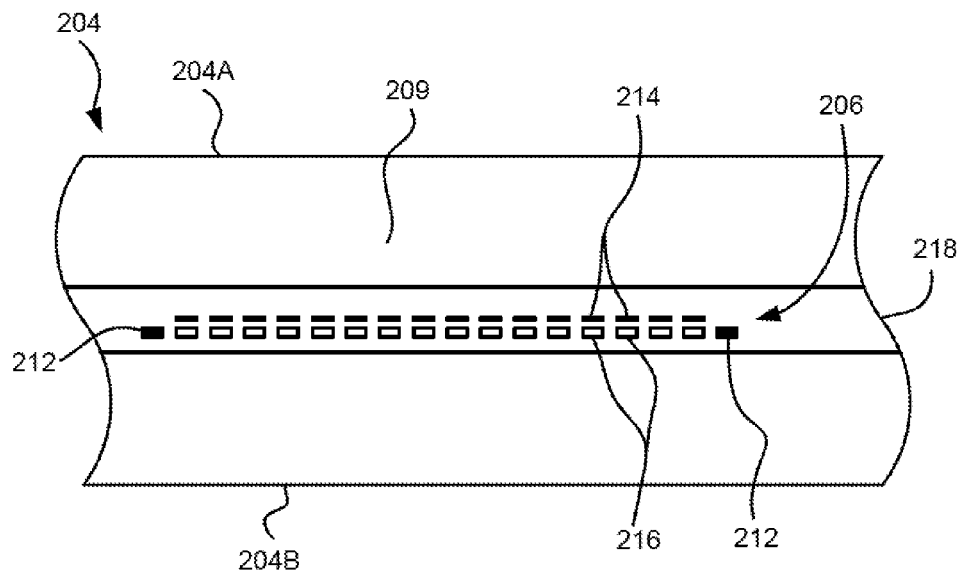
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
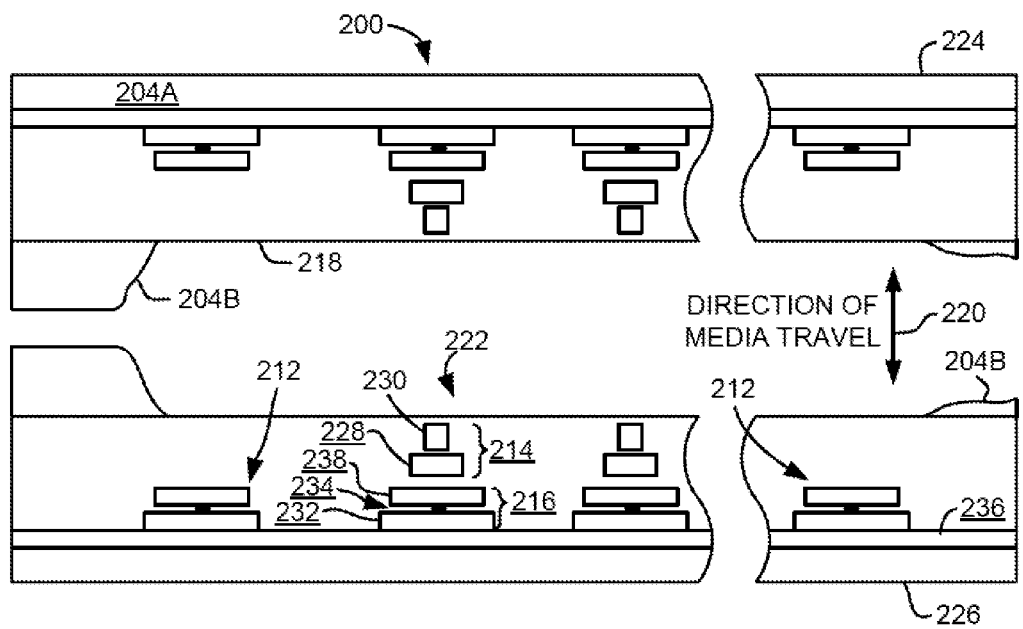
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
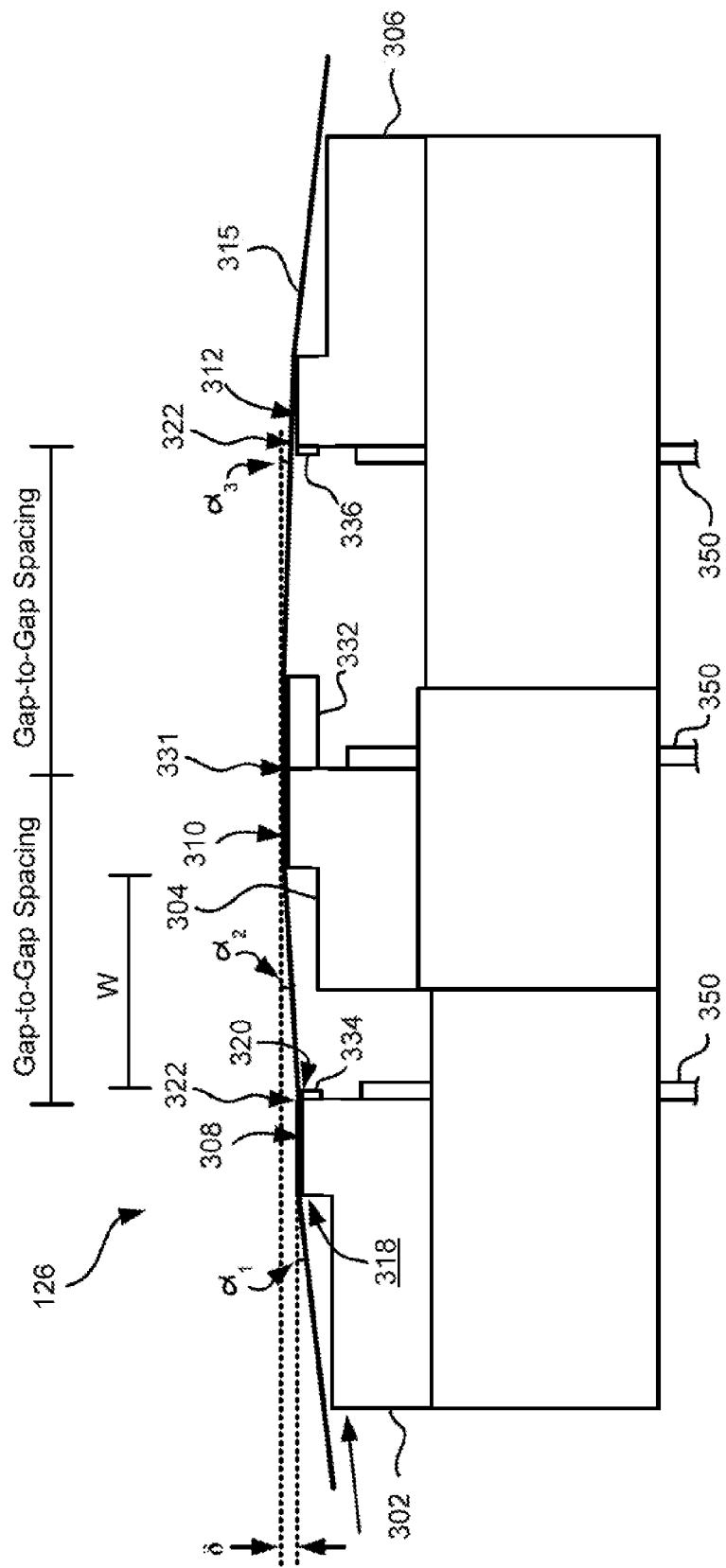
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
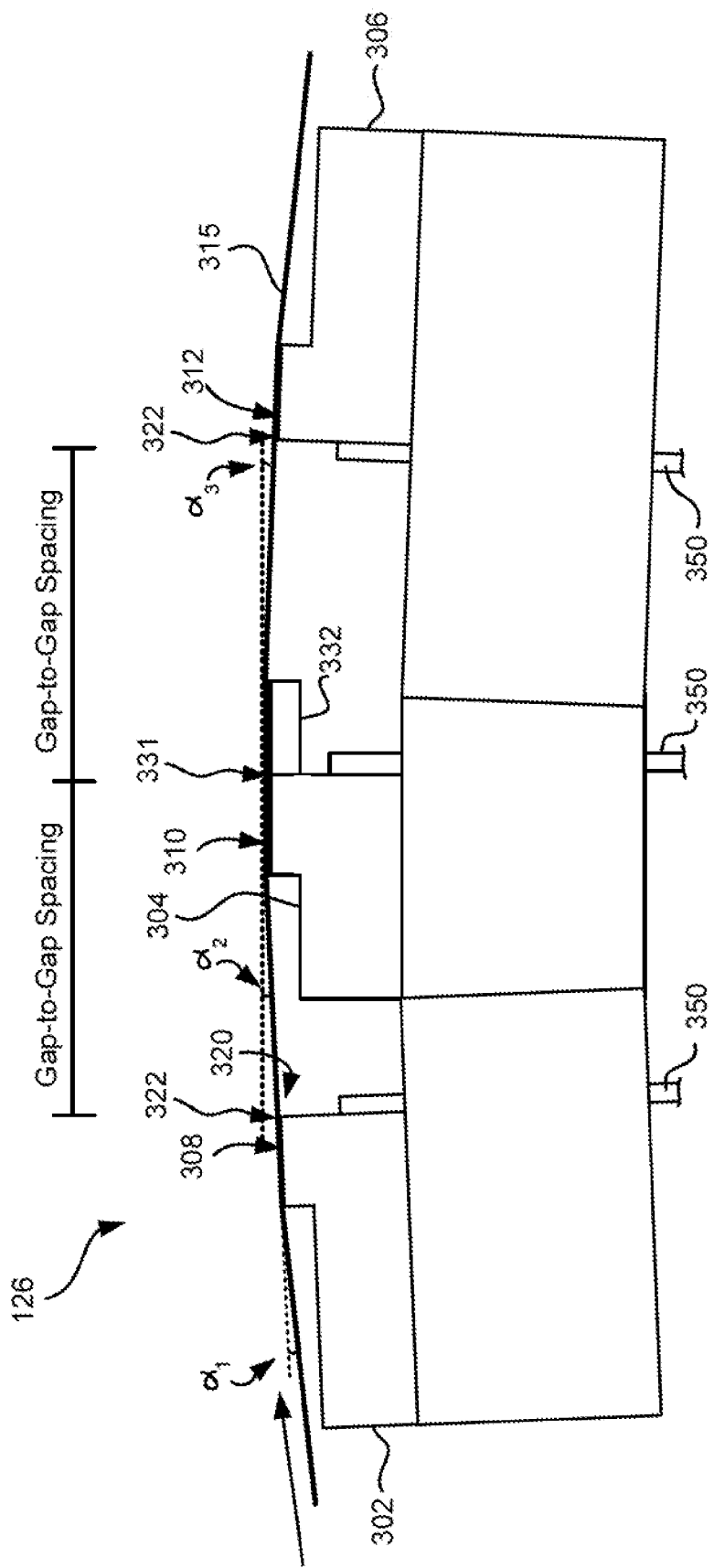
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape beating surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be as ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown FIGS. 5 and 6.

Figure 7:
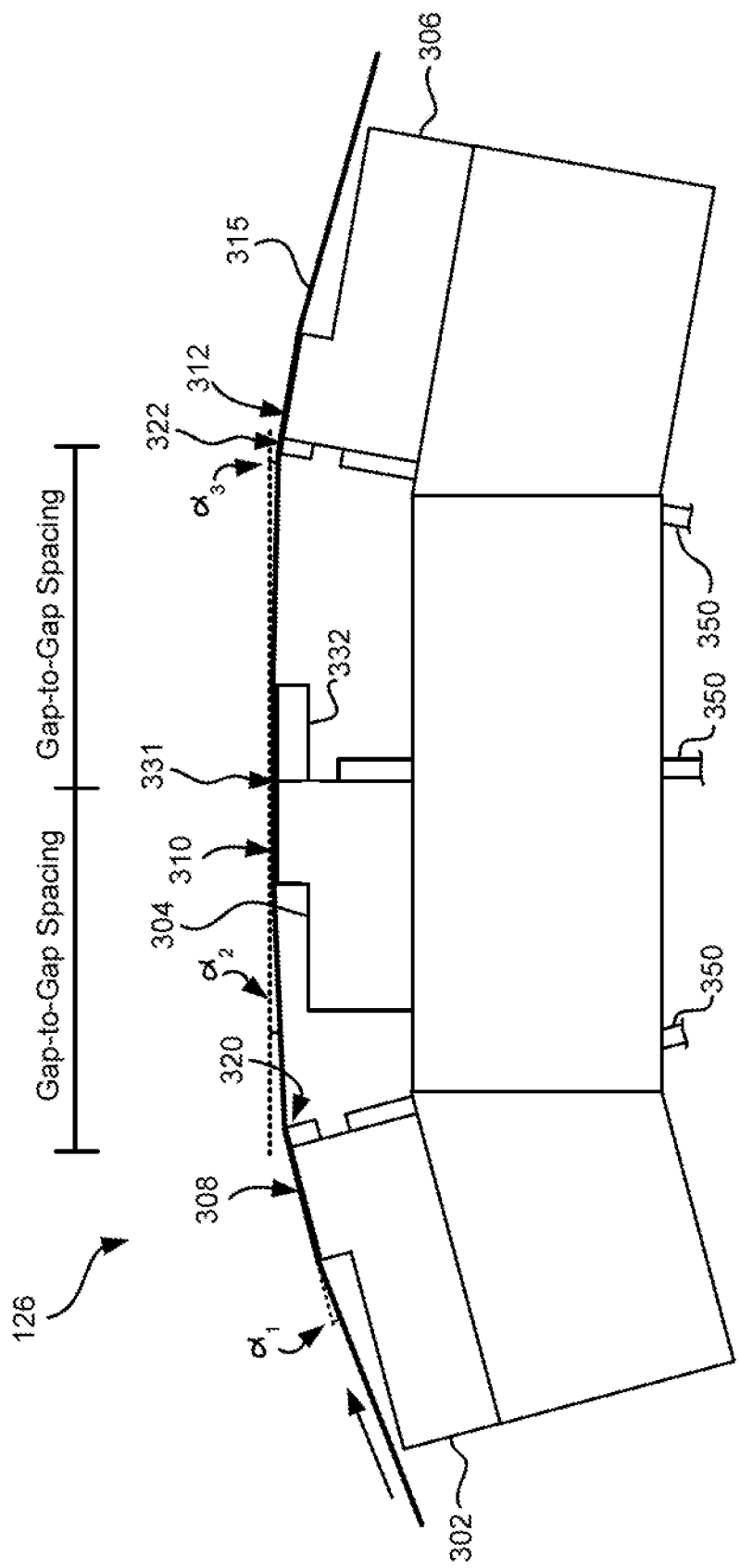
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

In conventional tape storage systems, the speed of the tape generally corresponds to the average angular velocity of each of the two reel motors associated with an incoming and an outgoing reel. Thus, the velocities of each of the two reel motors must be determined accurately in order to control tape motion and tension during normal drive operation. Typically, determination of the reel velocities requires knowledge of the radius of each tape pack. However, any inaccuracies in the radius measurement will lead to inaccuracies in the determination of the angular velocities of each reel. Such inaccuracies may cause velocity and tension fluctuations. Such tension fluctuations occurs where the outgress of the tape on the outgoing reel and the ingress of tape on the incoming reel do not match, yielding a tape tension that is either too high or too low. The resulting large tension transients are not desirable for thin media as it may stress the media, cause defects, and may even cause the media to break.

Previous methods of determining reel radius had limits regarding how accurately radii could be determined. For example, the previous methods were only able to calculate reel radius when the tape velocity was constant; thus, reel radius was unable to be measured during acceleration and deceleration operations. Further, no reel radii measurements were possible until after at least two revolutions of the motors associated with the reels, e.g., until the tape reached a constant (or cruise) velocity. Consequently, previous methods of calculating reel radius were subject to error, often leading to jumps or steps in the radius value once radius measurements were possible.

One previous method for determining reel radius utilized the following equations. For example, because the total length of tape in a given cartridge is constant, the sum of two reels' area is constant as described by:

$$\text{pi}*R0^2+\text{pi}*R1^2=K=\text{pi}*Rempty^2+\text{pi}*Rfull^2 \quad \text{(equation 1)}$$

In equation 1, R0=Rempty is the radius of the empty reel, which at startup is typically the reel in the drive. R1=Rfull is the radius of the full reel, which at startup is typically the reel on the tape cartridge. K is the sum of the two reel's area.

Additionally, the empty and full reels rotate at angles of theta0 and theta1, respectively. The tape is attached to both reels and moves together, thus:

$$R0*\text{theta0}=R1*\text{theta1} \quad \text{(equation 2)}$$

The combination and rearrangement of equation 1 and equation 2 yields the following known equation:

$$R0=\text{sqrt}(K/(1+(\text{theta1}/\text{theta0}))) \quad \text{(equation 3)}$$

With previous reel radii measurements, there was no accurate way to determine angles theta0 and theta1; thus time per revolution (TPR) was used instead. Accordingly tape speed was assumed to be constant, and theta1/theta0 was set equal to TPR1/TPR0. Generally, the tape drive logic circuitry measured TPR0 and TPR1 internally and then output RADIUS_FROM_TIME. However, as the drive microcode couldn't measure radii and utilize RADIUS_FROM_TIME during acceleration or deceleration, the microcode used fixed radii until RADIUS_FROM_TIME became stable, typically a wait of at least two revolutions for each reel or until the tape reached a constant velocity. This use of fixed radii during acceleration, deceleration and other non-constant tape velocities resulted in inaccurate radii measurements and erroneous angular velocity measurements. Additionally, inaccuracies were present due to the fact that there was only one update as to the radii measurement per revolution, rather than on a more continuous basis.

Embodiments of the present invention overcome the aforementioned drawbacks by providing a system, method and computer program product for accurately and continuously measuring the reel radius for each reel motor. Thus various embodiments enable smoother and more accurate tape velocity control, reducing and eliminating velocity spikes and/or tension transients in sonic embodiments. Some embodiments also provide a more continuous means of updating the radii measurement, rather than only once every reel rotation. Preferably, the system, method and computer program product may include each of the following steps: initialization where the an initial radius is selected for the outgoing and incoming reels; computation of the radii of the outgoing and incoming reels during the unwinding and winding, respectively; calculation of an offset using an accurate tape velocity based on reading information on the tape (e.g. a timing count between servo strips on the high resolution servo pattern on tape); and applying the offset.

Figure 8:
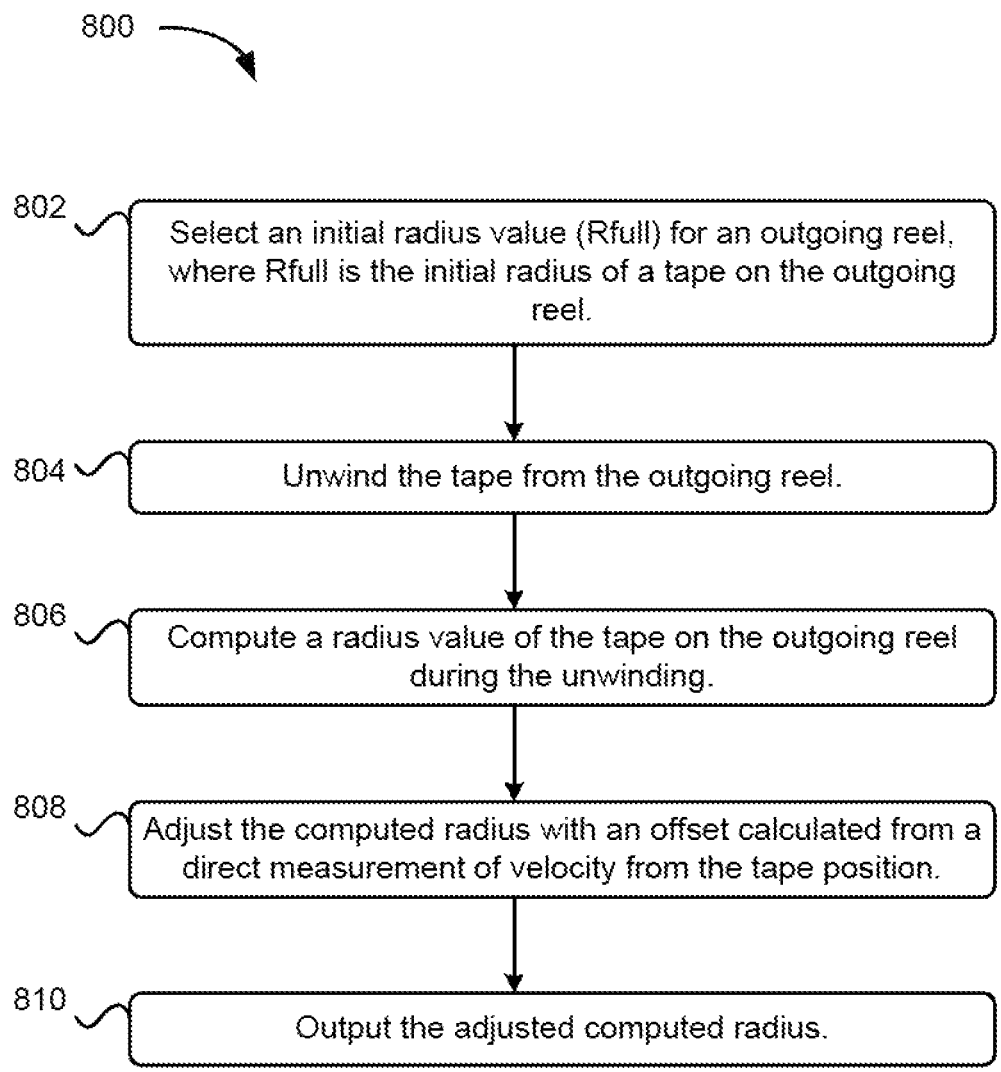
FIG. 8 is a flow diagram of a method according to one embodiment.

FIG. 8 shows a method 800 for accurately determining a radius of one or more tape reels according to one illustrative embodiment. As an option, the present method 800 may be implemented in conjunction with features from any other embodiments listed herein, such as those shown the other FIGS. Of course, however, this method 800 and others presented herein may be used in various applications and/or permutations, which may or may not be related to the illustrative embodiments listed herein. Further, the method 800 presented herein may be carried out in any desired environment. Moreover, more or less operations than those shown in FIG. 8 may be included in method 800, according to various embodiments.

As shown in FIG. 8 according to one approach, the method 800 includes selecting an initial radius value (Rfull) for an outgoing reel, where Rfull is the initial radius of a tape on the outgoing reel. See operation 802. As used herein, by way of example only to provide a context for the present description, and without intending to limit the scope of any embodiment, the outgoing reel will generally be referred to as the reel of a tape cartridge upon which the tape is wound, while the incoming reel may be a reel in the drive upon which the tape is wound upon loading of the cartridge into the drive. Those skilled in the art will appreciate that the labeling of the reels as incoming and outgoing can be reversed in a given embodiment and/or use implementation.

In one embodiment, the initial radius value may be selected based on a value stored in a tape cartridge having the outgoing reel. Thus, the initial radius value may be stored in cartridge memory, on the tape itself, etc. In another embodiment, the initial radius value may be stored away from the cartridge, such as in a table in a tape library, in a database, etc.

The method 800 also includes unwinding the tape from the outgoing reel and computing a radius value of the tape on the outgoing reel during the unwinding in operations 804 and 806, respectively. The unwinding may be effected by drive mechanism of the tape drive. The radius value(s) may be computed by the drive controller, a library coupled to the drive, etc. using any known technique. In one embodiment, the radius of the outgoing reel may be computed at some temporal interval. As used herein, a temporal interval may be periodic, predetermined, varied, calculated, received, scaled based on some criteria such as the tape velocity, etc. In another embodiment, the radius of the outgoing reel may be computed utilizing data from a hall count sensor.

In yet another embodiment the radius (Rout) of the tape on the outgoing reel may be computed according to a formula comprising Rout=Rfull−thickness*(hall count/hall_rev)+Rout_offset, where Rout is an initial radius value of the tape on the outgoing reel; thickness is a thickness of the tape; hall count is a value derived from a hall count sensor or the like; hall_rev is a number of hall counts in a single revolution (e.g. a single revolution of a motor associated with the outgoing reel); and Rout_offset is a predetermined or calculated offset value. For example, in one approach, Rout_offset may be set to 0 at initialization, and then updated at temporal intervals with computed offset values.

Again with reference to FIG. 8, the method 800 includes adjusting the computed radius with an offset calculated from a direct measurement of velocity from the tape position. See operation 808. As used herein, the direct measurement of velocity from the tape position may refer to a Bcount. Further, the direct measurement of velocity, or the Bcount, may be based on a primary velocity of the tape in one approach. As used herein, the primary velocity may be derived from one or more sensors reading information encoded on the tape. Said information, as used herein, may include, but is not limited to servo patterns, longitudinal positional (LPOS) information, etc. or other suitable sources of information as would be understood by one having skill in the art upon reading the present disclosure.

According to one embodiment, the method 800 may further include calculating the offset, where the offset may be calculated by determining a difference between the computed radius and a radius computed using the direct measurement of velocity from the tape position.

In one approach, the radius computed using the direct measurement of velocity from the tape position (R_Bcount) may be computed according to equation 4:

$$R\_bcount = FULL\_INDEX\_BCOUNT * B\_length / (2*pi) \quad \text{(equation 4)}$$

where FULL_INDEX_BCOUNT is the Bcount per revolution of 2*pi, and B_length is a distance between one or more tape position marks, such as servo stripes or clusters, LPOS marks, etc. B_length is typically determined by the tape format, and is typically less than 150 µm. In one approach, B_length may be 100 µm for some Linear Tape Open (LTO) compliant media. In another approach, the B_length may be 76 µm for other LTO compliant media.

In yet another embodiment, the radius computed using the direct measurement of velocity from the tape position, e.g., R_Bcount, may be calculated at temporal intervals. For example, in one approach, the R_Bcount may be calculated periodically. In another approach, one or more R_Bcount calculations may be averaged after a specified temporal interval has elapsed. For instance, after ten consecutive R_Bcount samples have been calculated, an average of the R_Bcount values may be computed.

In a further embodiment, computing the radius of the outgoing reel during the unwinding may be repeated at temporal intervals using the calculated offset.

The method 800 may also include, in one embodiment, altering a magnitude of the calculated offset to be within a range when the calculated offset exceeds a predefined value, where the computing the radius of the outgoing reel during the unwinding is repeated at temporal intervals using the adjusted calculated offset.

Additionally, in another embodiment, the calculated offset may be applied gradually. A gradual application of the offset may prevent a large shift in the radius of the outgoing reel. For example, in one approach, the offset may not exceed 5 µm per revolution of the motor associated with the outgoing reel.

With continued reference to FIG. 8, the method 800 includes outputting the adjusted computed radius. See operation 810. In one embodiment, the adjusted computed radius may be outputted to another process, to a memory, etc. Typically, the adjusted computed radius will be used by the controller to control the motor speed of one or both reel motors.

Figure 9:
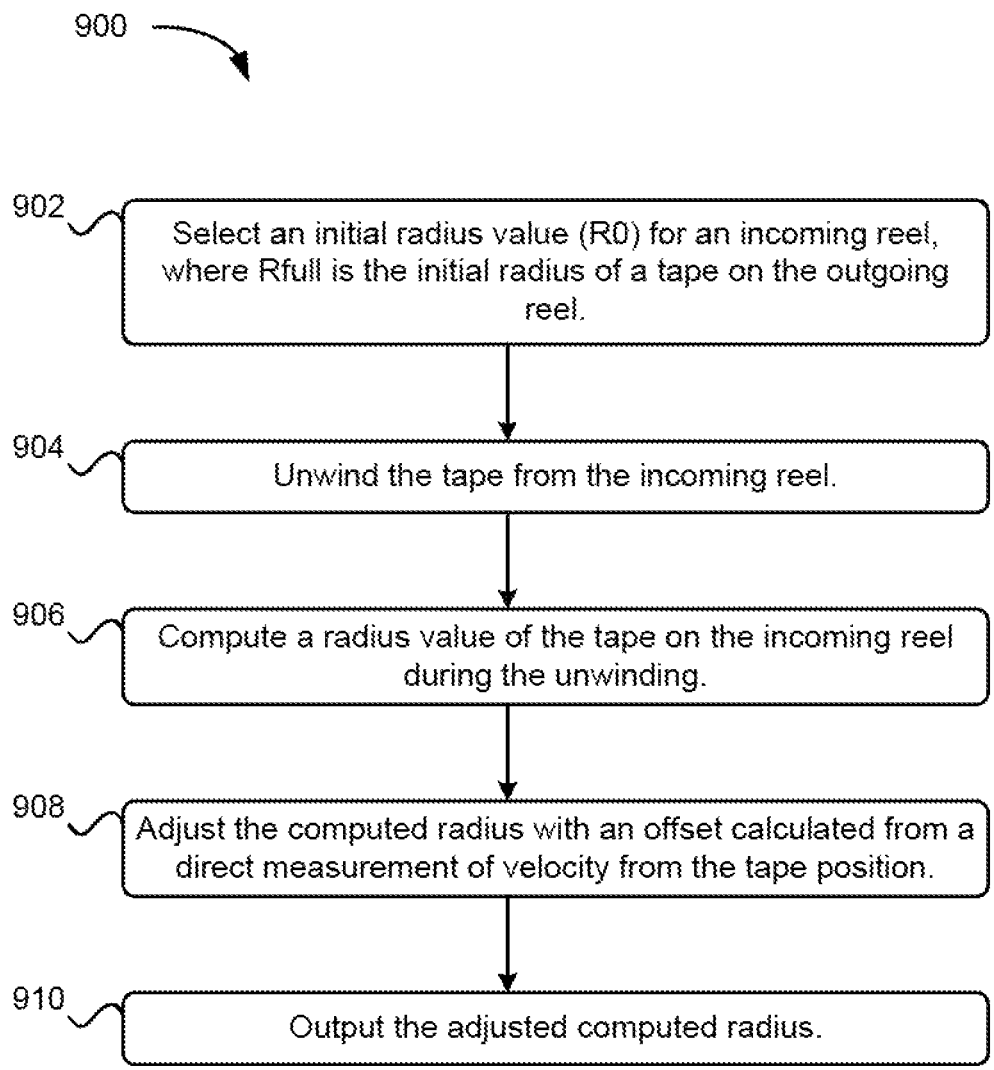
FIG. 9 is a flow diagram of a method according to one embodiment.

Referring now to FIG. 9, a method 900 for accurately determining a radius of one or more tape reels is shown according to one illustrative embodiment. As an option, the present method 900 may be implemented in conjunction with features from any other embodiments listed herein, such as those shown in the other FIGS. Of course, however, this method 900 and others presented herein may be used in various applications and/or permutations, which may of may not be related to the illustrative embodiments listed herein. Further, the method 900 presented herein may be carried out in any desired environment. Moreover, more or less operations than those shown in FIG. 9 may be included in method 900, according to various embodiments.

As shown in FIG. 9 according to one approach, the method 900 is initialized by selecting an initial radius value (R0) for an incoming reel, where R0 is the initial radius of the incoming reel. See operation 902. As noted above, the incoming reel may typically be the reel in a tape drive upon which the tape is wound.

The method 900 also includes winding the tape onto the incoming reel and computing a radius value of the tape on the incoming reel during the winding in operations 904 and 906, respectively. In one embodiment, the radius of the incoming reel may be computed at some temporal interval. In another embodiment, the radius of the incoming reel is computed utilizing data from a hall count sensor.

In yet another embodiment, the radius of the incoming reel may be computed according to a formula comprising Rin=R0+thickness*hall count/hall_rev+Rin_offset, where R0 is an initial radius value of the incoming reel; thickness is a thickness of the tape; hall count is a value derived from a hall count sensor; hall_rev is a number of hall counts in a single revolution (e.g. a single revolution of a motor associated with the incoming reel); and Rin_offset is a predetermined or calculated offset value. For example, in one approach, Rin_offset may be set to 0 at initialization and then updated with computed offset values.

With continued reference to FIG. 9, the method 900 includes adjusting the computed radius with an offset calculated from a direct measurement of velocity from the tape position. See operation 908. The direct measurement of velocity from the tape position (e.g. the Bcount) may be based on a primary velocity of the tape in one approach. As used herein, the primary velocity may be derived from one or more sensors reading information encoded on the tape. Further, said information, as used herein, may include, but is not limited to, servo patterns, longitudinal positional (LPOS)

information, etc. or other suitable sources of information as would be understood by one having skill in the art upon reading the present disclosure.

According to one embodiment, the method 900 may further include calculating the offset, where the offset is calculated by determining a difference between the computed radius and a radius computed using the direct measurement of velocity from the tape position.

In another embodiment, the radius computes using the direct measurement of velocity from the tape position (R_Bcount) may be computed according to equation 4, above.

In yet another embodiment, the radius computed using the direct measurement of velocity from the tape position, e.g., R_Bcount, may be calculated at temporal intervals. For example, in one approach, the R_Bcount may be calculated periodically. In another approach, one or more R_Bcount calculations may be averaged after a specified temporal interval has elapsed. For instance, after ten consecutive R_Bcount samples have been calculated, an average may of the R_Bcount values may be computed.

In a further embodiment, computing the radius of the incoming reel during the winding is repeated at temporal intervals using the calculated offset.

The method 900 may also include, in one embodiment, altering a magnitude of the calculated offset to be within a range when the calculated offset exceeds a predefined value, wherein the computing the radius of the incoming reel during the winding is repeated at temporal intervals using the adjusted calculated offset.

Additionally, in another embodiment, the calculated offset may be applied gradually. A gradual application of the offset may prevent a large shift in the radius of the incoming reel. For example, in one approach, the offset may not exceed 5 μm per revolution of the motor associated with the incoming reel.

Again, with reference to FIG. 9, the method 900 includes outputting the adjusted computed radius. See operation 910. In one embodiment, the adjusted computed radius may be outputted to another process, to a memory, etc. Typically, the adjusted computed radius will be used by the controller to control the motor speed of one or both reel motors.

According to another embodiment, the method 900 further includes initializing by selecting an initial radius value (Rfull) for an outgoing reel, where Rfull is the initial radius of the tape on the outgoing reel; unwinding the tape from the outgoing reel during the winding of the tape onto the incoming reel; computing a radius value of the tape on the outgoing reel during the unwinding; adjusting the computed radius of the tape on the outgoing reel with the offset calculated from the direct measurement of velocity from the tape position (e.g. the B count or primary velocity); and outputting the adjusted computed radius of the tape on the outgoing reel to another process, to a memory, etc. In one approach, the radius value of the tape on the outgoing reel is computed during the unwinding at some temporal interval.

A drive may implement one or more of the foregoing methodologies in a given implementation. In some embodiments, the drive may determine an adjusted computed radius for each of the reels. Moreover, such methodology may be used to determine a radius in acceleration, cruise, and/or deceleration states.

Further, while radii are used herein, the computations may be adjusted to use a diameter instead of a radius by simply adding an operator to divide the diameter by two or multiply the radius by 2, in some embodiments. Stated another way, a diameter is merely two times the radius; accordingly, use of a diameter instead of a radius is deemed equivalent to use of a radius, and a diameter value can be considered to be a radius value as used herein (e.g., diameter/2=radius). Thus, computations and/or systems that use a diameter are equivalent to those using a radius, as would be obvious to those skilled in the art upon reading the present disclosure.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions ma also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    computing a radius value of a tape on an outgoing reel during unwinding of the tape from the outgoing reel;
    adjusting the computed radius with an offset calculated from a primary velocity of the tape; and
    outputting the adjusted computed radius.

2. The method of claim 1, wherein the radius value of the tape on the outgoing reel is computed utilizing data from a hall count sensor.

3. The method of claim 2, wherein the radius (Rout) of the tape on the outgoing reel is computed according to a formula comprising Rout=Rfull−thickness*(hall count/hall_rev)+Rout_offset, wherein Rfull is an initial radius value of the tape on the outgoing reel, thickness is a thickness of the tape, hall count is a value derived from a hall count sensor, hall_rev is a number of hall counts in a single revolution, Rout_offset is a predetermined or calculated offset value.

4. The method of claim 3, wherein the initial radius value is selected based on a value stored in a tape cartridge having the outgoing reel.

5. The method of claim 1, further comprising calculating the offset, wherein the offset is calculated by determining a difference between the computed radius and a radius computed using the primary velocity of the tape.

6. The method of claim 5, wherein the computing the radius value of the tape on the outgoing reel during the unwinding is repeated at temporal intervals using the calculated offset.

7. The method of claim 5, further comprising altering a magnitude of the calculated offset to be within a range when the calculated offset exceeds a predefined value, wherein the computing the radius value of the tape on the outgoing reel during the unwinding is repeated at temporal intervals using the adjusted calculated offset.

8. A method, comprising:
    computing a radius value of a tape on an incoming reel during winding while the tape is being wound onto the incoming reel;
    adjusting the computed radius with an offset calculated from a primary velocity of the tape; and
    outputting the adjusted computed radius.

9. The method of claim 8, wherein the radius value of the tape on the incoming reel is computed utilizing data from a hall count sensor.

10. The method of claim 9, wherein the radius (Rin) of the tape on the incoming reel is computed according to a formula comprising Rin=R0+thickness*hall count/hall_rev+Rin_offset, wherein R0 is an initial radius value of the incoming reel, thickness is a thickness of the tape, hall count is a value derived from a hall count sensor, hall_rev is a number of hall counts in a single revolution, Rin_offset is a predetermined or calculated offset value.

11. The method of claim 8, further comprising calculating the offset, wherein the offset is calculated by determining a difference between the computed radius and a radius computed using the primary velocity of the tape.

12. The method of claim 11, wherein the computing the radius value of the tape on the incoming reel during the winding is repeated at temporal intervals using the calculated offset.

13. The method of claim 11, further comprising altering a magnitude of the calculated offset to be within a range when the calculated offset exceeds a predefined value, wherein the computing the radius value of the tape on the incoming reel during the winding is repeated at temporal intervals using the adjusted calculated offset.

14. The method of claim 8, further comprising:
    selecting an initial radius value (Rfull) for an outgoing reel, where Rfull is the initial radius of the tape on the outgoing reel;
    unwinding the tape from the outgoing reel during the winding of the tape onto the incoming reel;
    computing a radius value of the tape on the outgoing reel during the unwinding;
    adjusting the computed radius of the tape on the outgoing reel with the offset calculated from the primary velocity of the tape; and
    outputting the adjusted computed radius of the tape on the outgoing reel.

15. A system, comprising:
    a magnetic head;
    a drive mechanism for passing a magnetic medium over the magnetic head; and a controller electrically coupled to the magnetic head, wherein the controller is configured and/or programmable to perform at least one of the following processes:
compute a radius value of a tape on an incoming reel during winding of the tape onto the incoming reel, adjust the computed radius with a first offset calculated from a primary velocity of the tape, and output the adjusted computed radius of the tape on the incoming reel; and
compute a radius value of the tape on an outgoing reel during unwinding of the tape from the outgoing reel, adjust the computed radius with a second offset calculated from the primary velocity of the tape, and output the adjusted computed radius of the tape on the outgoing reel.

16. The system of claim 15, wherein the radius value of the tape on the incoming and/or outgoing reel is computed utilizing data from a hall count sensor.

17. The system of claim 15, further comprising calculating the first and/or second offset, wherein the first and/or second offset is calculated by determining a difference between the computed radius and a radius computed using the primary velocity of the tape.

18. A computer program product for computing a radius value of a tape on a reel, the computer program product comprising a non-transitory computer readable storage medium having program instructions embodied therewith, the program instructions executable by a device to cause the device to:
perform at least one of the following processes:
compute a radius value of a tape on an incoming reel during winding of the tape onto the incoming reel, adjust the computed radius with a first offset calculated from a primary velocity of the tape, and output the adjusted computed radius of the tape on the incoming reel; and
compute a radius value of the tape on an outgoing reel during unwinding of the tape from the outgoing reel, adjust the computed radius with a second offset calculated from the primary velocity of the tape, and output the adjusted computed radius of the tape on the outgoing reel.

19. The computer program product of claim 18, wherein the radius value of the tape on the incoming and/or outgoing reel is computed utilizing data from a hall count sensor.

20. The computer program product of claim 18, further comprising calculating the first and/or second offset, wherein the first and/or second offset is calculated by determining a difference between the computed radius and a radius computed using the primary velocity of the tape.

* * * * *